(12) United States Patent
Bryngelsson et al.

(10) Patent No.: US 11,091,057 B2
(45) Date of Patent: Aug. 17, 2021

(54) METHOD AND SYSTEM FOR CONTROLLING A BATTERY IN A VEHICLE

(71) Applicant: VOLVO TRUCK CORPORATION, Gothenburg (SE)

(72) Inventors: Hanna Bryngelsson, Gothenburg (SE); Jonas Hellgren, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 221 days.

(21) Appl. No.: 16/462,773

(22) PCT Filed: Dec. 1, 2016

(86) PCT No.: PCT/EP2016/079406
§ 371 (c)(1),
(2) Date: May 21, 2019

(87) PCT Pub. No.: WO2018/099561
PCT Pub. Date: Jun. 7, 2018

(65) Prior Publication Data
US 2019/0366874 A1    Dec. 5, 2019

(51) Int. Cl.
*B60L 58/13* (2019.01)
*B60L 58/16* (2019.01)
*B60L 58/24* (2019.01)

(52) U.S. Cl.
CPC .............. *B60L 58/13* (2019.02); *B60L 58/16* (2019.02); *B60L 58/24* (2019.02); *B60L 2240/545* (2013.01); *B60L 2240/547* (2013.01); *B60L 2240/549* (2013.01)

(58) Field of Classification Search
CPC .... B60L 58/13; B60L 58/16; B60L 2240/549; B60L 2240/547; B60L 58/24

USPC ......................................................... 320/104
See application file for complete search history.

(56) References Cited

U.S. PATENT DOCUMENTS

| | | | | |
|---|---|---|---|---|
| 6,344,732 | B2 * | 2/2002 | Suzuki | B60W 50/0097 320/132 |
| 6,487,477 | B1 * | 11/2002 | Woestman et al. | B60L 50/61 701/22 |
| 9,381,825 | B2 * | 7/2016 | Li | G01R 31/367 |
| 9,758,052 | B2 * | 9/2017 | Wu et al. | H04W 64/00 |
| 9,889,751 | B2 * | 2/2018 | Jang et al. | B60L 3/0046 |
| 10,752,126 | B1 * | 8/2020 | Zhang et al. | G01R 31/3842 |
| 2014/0372053 | A1 | 12/2014 | Lin et al. | |
| 2016/0052418 | A1 | 2/2016 | Yang et al. | |
| 2016/0137089 | A1 | 5/2016 | Wu et al. | |

OTHER PUBLICATIONS

International Search Report and Written Opinion dated Nov. 3, 2017 in International Application No. PCT/EP2016/079406.

* cited by examiner

*Primary Examiner* — Sun J Lin
(74) *Attorney, Agent, or Firm* — Venable LLP; Jeffri A. Kaminski

(57) ABSTRACT

The invention relates to a method which comprises communicating a power capacity of a battery of a vehicle in a system comprising a battery and a battery control unit for controlling said battery. The method further comprises, in the battery control unit, receiving a request comprising a power profile describing a power transfer to or from the battery as a function of time, determining if the battery is capable of receiving or providing power corresponding to the requested power profile.

22 Claims, 5 Drawing Sheets

METHOD AND SYSTEM FOR CONTROLLING A BATTERY IN A VEHICLE

TECHNICAL FIELD

The invention relates to a method and a system for controlling the battery in a vehicle.

The invention can be applied in heavy-duty vehicles, such as trucks, buses and construction equipment. Although the invention will be described with respect to a bus, the invention is not restricted to this particular vehicle, but may also be used in other vehicles such as cars as well as various heavy-duty vehicles.

BACKGROUND

In a hybrid or electric vehicles, it is important to know the power capacity of the battery used for vehicle propulsion. Acceleration, charging from an external grid and regenerative braking are example situations where such knowledge is critical for correctly utilizing the battery. Thereby, it is important to accurately determine battery properties such as state of charge (SoC) and state of power (SoP) such that a battery control system can determine how much power can be provided to and received from the battery.

A conventional method of interaction with the battery is a discharging cycle where the battery provides a constant maximum available power during a specific time window.

For example, US2016/0052418 discloses a method for battery system peak power estimation. Conventional state of Power (SOP) estimation techniques do not consider variations of all resistor and capacitor values during a constant current pulse, particularly over long time intervals. In view of this, US2016/0052418 describes a technique where an initial peak current at a start of a current prediction period is determined based on a measurement of operating parameters and where instantaneous peak current is determined based on the initial peak current by performing voltage-limited extrapolation of resistances and open-circuit voltage of a battery model for the battery system.

However, the peak current only gives limited information about the capabilities of the battery, and this is in many cases a restrictive and non-flexible approach. For example, a vehicle function may require a battery to provide power, i.e. to discharge, for an extended time period, in which case the peak current does not provide sufficient information to determine if the battery is capable of providing the desired power.

Accordingly, there is a need or an improved method and system for providing information concerning the properties of a battery in a hybrid or electrical vehicle.

SUMMARY

An object of the invention is to provide a method and a system for accurately communicating a power capacity of a battery in a vehicle to a vehicle system.

According to a first aspect of the invention, the object is achieved by a method of communicating a power capacity of a battery of a vehicle according to claim 1.

Accordingly, there is provided a method which comprises communicating a power capacity of a battery of a vehicle in a system comprising a battery and a battery control unit for controlling said battery. The method further comprises, in the battery control unit, receiving a request comprising a power profile describing a power transfer to or from the battery as a function of time, determining if the battery is capable of receiving or providing power corresponding to the requested power profile; and providing a response indicative of a compliance with the requested power profile.

The power transfer should in the present context be interpreted as a charging or discharging cycle of the battery defined by the power profile. Thereby, the power profile can describe a charging profile, a discharging profile, or a combination thereof. Charging and discharging may also be referred to as power input to or output from the battery, respectively. Moreover, the duration of the power profile may be arbitrarily selected, and the power profile may comprise a plurality of different stages, each stage requiring a specified power output or input for a specified period of time.

Hereby, a method is provided which increases the flexibility in a battery system since the power profile can describe a more complex power transfer over time as compared to known systems which are merely indicating the maximum available power available from the battery.

According to one embodiment of the invention, the response indicative of a compliance with the requested power profile may comprise a Boolean response. The control unit will thereby respond to a request with a "yes" or "no" response, or similar, to the requested power profile depending on if the battery is capable of providing or receiving power corresponding to the requested power profile or not. In case of a positive response, "yes", the requesting function may proceed to draw power from or provide power to the battery according to the requested profile. In the case of a negative response, "no", the battery is not capable of providing or receiving power corresponding to the requested power profile. If the response is negative, the requesting function may for example modify the power profile and proceed with a new request.

According to one embodiment of the invention, the method may comprise providing a response comprising a suggested power profile different from the requested power profile. If the battery is not capable of fulfilling the request, the battery control unit may for example determine a power profile which is as similar as possible to the requested profile and which the battery is capable of complying with, and provide the updated profile in a response to the requesting vehicle function. The requesting vehicle functionality may thereby utilize the battery even if the battery is not capable of accommodating the specific requested power profile. Moreover, the suggested power profile may be optimized based on the known properties of the battery. Accordingly, the suggested power profile may be different from the requested power profile also if the battery unit is able to comply with the requested power profile. The requesting functionality may then determine whether to use the requested power profile or an alternative power profile suggested by the battery control unit. Hereby, a more efficient use of the battery can be achieved.

According to a further embodiment, the response may comprise a plurality of different suggested power profiles. Hereby, the requesting function may select the most suitable power profile out of a plurality of different power profiles, which increases the probability that a power profile is found which is as near the requested power profile as possible, or which provides other advantages.

According to one embodiment of the invention, the response may comprise a maximum constant power transfer for a specified period of time. If, for example, the battery cannot accommodate the requested power profile, the response may comprise a power profile in the form of a constant power for a specified time, which can also be seen as a safe mode. Thereby, a power transfer is made possible even if is not the requested power transferring, ensuring that the battery can be used to receive or provide at least part of the requested power to be transferred. The response may for example be a maximum constant power transfer for a time equal to the duration of the requested power profile, thereby allowing the battery to be utilized for the requested time period, even if the requested power profile cannot be accommodated.

Furthermore, the battery control unit may provide an alternative power profile also when the battery is capable of accommodating the requested power profile. Accordingly, a power profile which is more suitable for the specific battery conditions may be found.

According to one embodiment of the invention, the requested power profile may be a time continuous power profile, in which case the method may comprise discretizing the requested power profile and providing a response in the form of a time discrete power profile. The discretized power defines different stages in the power profile by a power level and a time period for which the defined power level should be sustained. Hereby, the amount of information which must be provided in the response from the battery control unit can be significantly reduced. This may be particularly advantageous in order to improve the speed of communication if a plurality of power profiles are to be provided, since the amount of data to be sent in a response is significantly reduced. It is of course also possible that the request comprises a discretized power profile.

According to one embodiment of the invention, determining if the battery is capable of receiving or providing power corresponding to the requested power profile may comprise simulating battery behaviour as a function of time based on a predicted voltage and temperature of the battery for the requested power profile. Based on the simulation, the battery control unit can determine if the requested power profile would result in violation of voltage and/or temperature limitations of any of the cells in the battery, or if the battery has sufficient charge storing capacity for complying with the request. The simulated battery behavior may also be used to determine one or more new suggested power profiles which are similar to the requested profile but which are within the allowed operational parameters of the battery.

According to one embodiment of the invention, the battery behavior may be simulated based on a cell model of said battery. A cell model is advantageously used since a fast and accurate simulation of battery parameters can be performed using the cell model.

According to one embodiment of the invention, the request may be received from a vehicle control unit of the vehicle. The vehicle control unit may be specific or general control unit for controlling a vehicle functionality, and the vehicle control unit may for example communicate with the battery control unit via a CAN-bus. Alternatively, the vehicle control unit and the battery control unit may be implemented in the same physical unit, such as a multipurpose micro processing unit. Irrespective of the selected physical implementation, the vehicle control unit is capable of transmitting a power profile to the battery control unit, and to receive a response either as a Boolean "yes" or "no" or in the form of one or more suggested power profiles.

According to one embodiment of the invention, the request may comprise a power profile to be provided by the battery to the vehicle during a predicted power consumption cycle of the vehicle. Hereby, based on the response form the battery control unit, the vehicle control unit will know if the battery is capable of providing the required power or if an additional power source must be used. Such an additional power source may for example be a combustion engine of a vehicle. The battery may also be capable of providing power corresponding to part of the requested power. An advantage of this is that the vehicle control unit may know beforehand if, when, and to what extent additional power sources need to be employed, which may be used to increase the overall efficiency of the power source utilization since for example a combustion engine can be prepared for providing the required power.

According to one embodiment of the invention, the request may comprise a power profile to be provided to the battery during a predicted power generation cycle of the vehicle. Vehicle power generation may for example occur during braking or when the vehicle is travelling in a downhill slope, in which case it is advantageous to use the generated power to charge the battery.

According to one embodiment of the invention, the request may comprise a power profile based on a predicted route of the vehicle. The request may for example originate from a vehicle control unit which is connected to a navigation system of the vehicle such that an upcoming route, or at least part of a route, is known. Hereby, the battery use can be optimized based on a predicted power profile for a given route. This is particularly advantageous for automated or self-driving vehicles, since the battery usage can be optimized for an entire route, and not just based on an instantaneous request.

According to one embodiment of the invention, the request may be received from a charging station external to the vehicle. Moreover, the request may comprise a power profile to be provided to the battery during a predicted charging cycle. Hereby, the battery control module can determine if the battery is capable of being charged according to a suggested charging profile.

According to one embodiment of the invention, the request from the charging station may comprise a predetermined charging time. A user may for example specify a charging time when connecting the vehicle to the charging station, in which case it is desirable that the battery control unit responds with the power profile most suitable for the specified charging time.

According to one embodiment of the invention, the request may comprise information of charging properties of the charging station, and the response may comprise a suggested power profile for charging the battery based on the charging properties of the charging station. Hereby, the battery charging can be optimized based on a combined evaluation of the properties of the charging station and the capabilities of the battery.

There is also provided a computer program comprising program code means for performing the steps of any of above described embodiments when the program is run on a computer, and a computer readable medium carrying the aforementioned computer program.

According to a second aspect of the invention, there is provided a battery control system of a vehicle comprising a battery and a battery control unit. The battery control unit is configured to receive a request comprising a power profile describing a power transfer to or from the battery as a function of time, determine if the battery is capable of receiving or providing power corresponding to the requested power profile; and to provide a response indicative of a compliance with the requested power profile.

According to one embodiment of the invention, the battery control system may further comprise a vehicle control unit, wherein the vehicle control unit is configured to provide the request to the battery control unit.

According to one embodiment of the invention the battery control system may further comprise a charging station external to the vehicle, and the charging station may be configured to provide the request to the battery control unit.

There is also provided a vehicle comprising a battery control system according to any of the above described embodiments.

Features, effects and advantages of the second aspect of the invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of the battery control system and method according to the present invention are mainly described with reference to heavy vehicle comprising a hybrid propulsion system in the form of a combination of battery powered electric motors and an internal combustion engine. However, it should be noted that various embodiments of the described invention are equally applicable for a wide range of hybrid and electrical vehicles.

Figure 1:
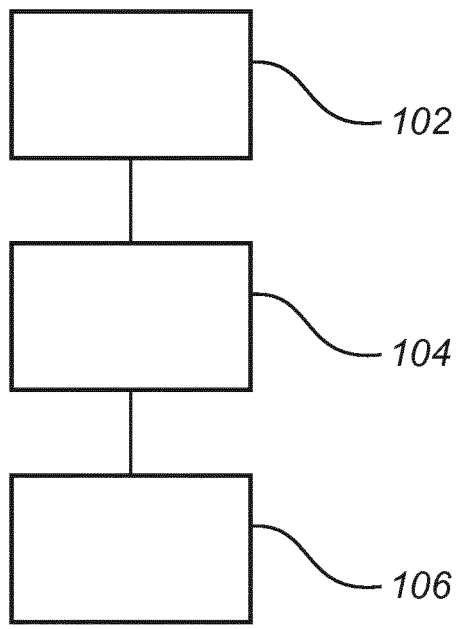
FIG. 1 is a flow chart outlining the general steps of a method according to an embodiment of the invention.
Figure 2:
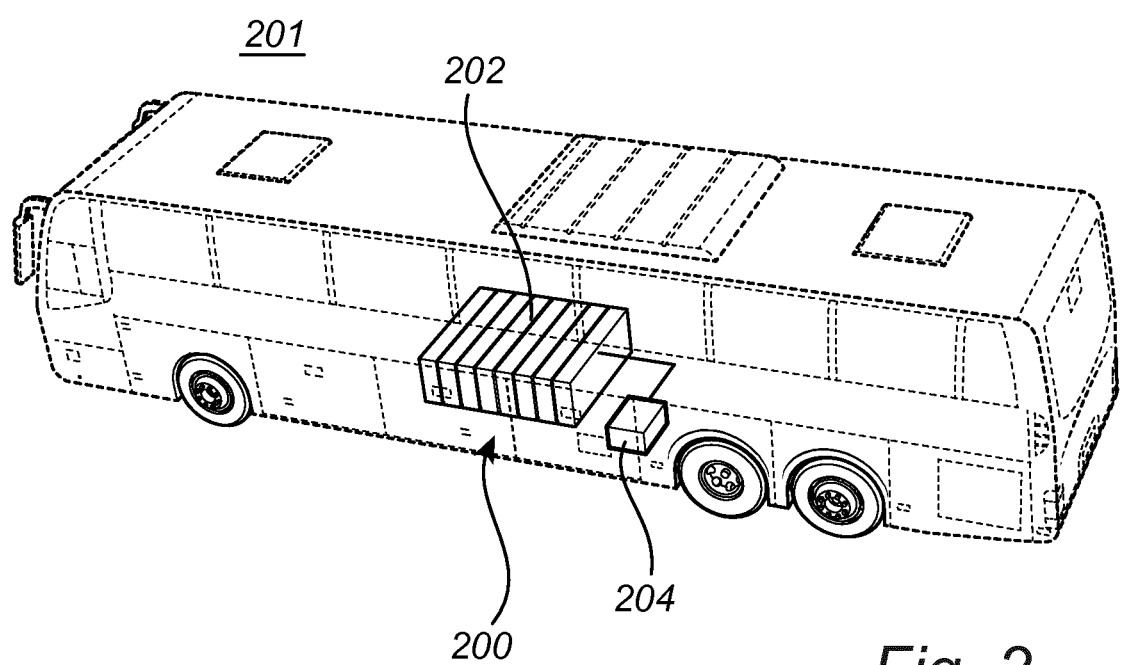
FIG. 2 schematically illustrates a vehicle comprising a battery control system according to an embodiment of the invention.

FIG. 1 is a flow chart outlining the general steps of a method 100 according to an embodiment of the invention. The method of FIG. 1 will be described with further reference to the vehicle 201 comprising a battery control system 200 illustrated in FIG. 2. In particular, FIG. 1 outlines a method of communicating a power capacity of a battery 202 of a vehicle 201 in a system comprising a battery 202 and a battery control unit 204 for controlling the battery 202.

In a first step, the method comprises receiving 102, in the battery control unit 204, a request comprising a power profile describing a power transfer to or from the battery as a function of time. In a second step, the method comprises determining 104 if the battery is capable of receiving or providing power corresponding to the requested power profile, and in a final step, in the battery control unit 204, providing 106 a response indicative of a compliance with the requested power profile. The response indicative of compliance may be a Boolean response, i.e. "yes" or "no", or any equivalent predetermined Boolean response (e.g. "1" or "0") indicating compliance or non-compliance with the requested power profile. The response may also comprise one or more suggested power profiles.

The power profile defines a power transfer to or from the battery 202, i.e. charging or discharging of the battery 202. Factors which determine if the battery 202 is capable of receiving or providing the requested power may include voltage, current, temperature, state of power (SoP), state of charge (SoC) and state of health (SoH) of the battery.

Figure 3:
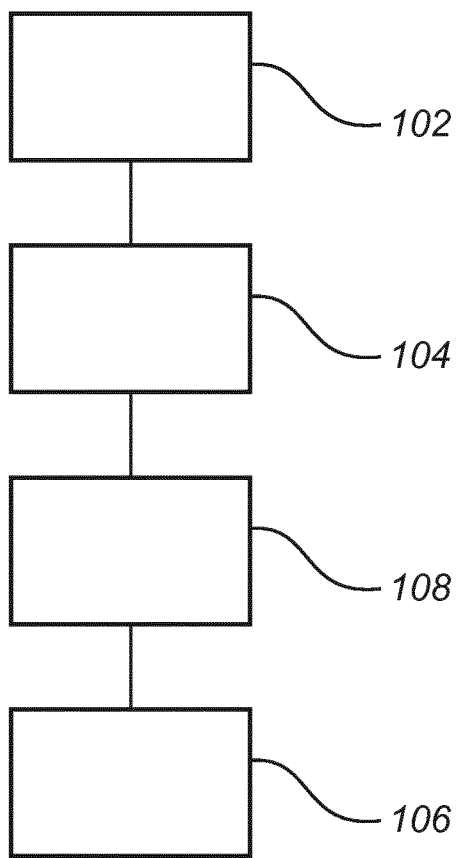
FIG. 3 is a flow chart outlining the general steps of a method according to an embodiment of the invention.

Moreover, determining if the battery 202 is capable of receiving or providing power corresponding to the requested power profile may comprise the step of simulating 108 a battery behavior as a function of time based on the requested power profile in order to simulate a resulting predicted voltage and temperature of the battery 202 for the requested power profile, as illustrated by the flow chart of FIG. 3. The simulation may then be performed using a cell model of the battery 202. A cell model includes a set of resistances which depends on temperature, SoC and age. The cell model can for a certain applied current at a certain SoC, temperature and age and actual voltage predict what the voltage profile of the battery 202 will look like for a certain current/power profile. In particular, there is a voltage limit for all battery cells that needs to be adhered to. The cell model can also estimate the heat generation from the resistive losses in the battery 202. By comparing the simulated resulting temperature and voltage with current, temperature and voltage limits, it can be determined if the battery can provide or receive power according to the requested power profile. Accordingly, an absolute current limit to or from the battery needs to be considered when determining if a power transfer defined by a requested a power profile is possible to achieve.

Moreover, the response from the battery control unit 204 may comprise one or more suggested power profiles which are different form the requested profile. The battery control unit 204 may suggest a different power profile also when the battery is capable of complying with the requested power profile. Thereby, the power profile which is most advantageous for the battery can be used. In some applications, it may for example be prioritized to maintain the battery health and therefore desirable to utilize the battery 202 in a manner determined by the battery control unit 204 even if the battery in principle would be capable of accommodating the requested power profile. If the battery control unit 204 responds with a plurality of different power profiles, the requesting functionality may be free to choose the most suitable power profile. The response from the battery control unit 204 may also comprise information relating to battery degradation, temperature increase and other relevant parameters for the suggested power profile or profiles. Thereby, the power profiles can be more easily compared and the requesting functionality receives further information to be used for selecting an appropriate power profile.

In general, the power to or from the battery 202 needs to be reduced when the charge level (SoC) of the battery increases. A reduction in power can be achieved by reducing the current/power with increasing SoC level. For example, the power may be constant up to a certain SoC level after which the power decreases as a slope. The reduction in power with increasing SoC can also be achieved by maintaining a constant voltage, and when the SoC reaches a certain level the current will automatically decrease thereby reducing the power.

Figure 4:
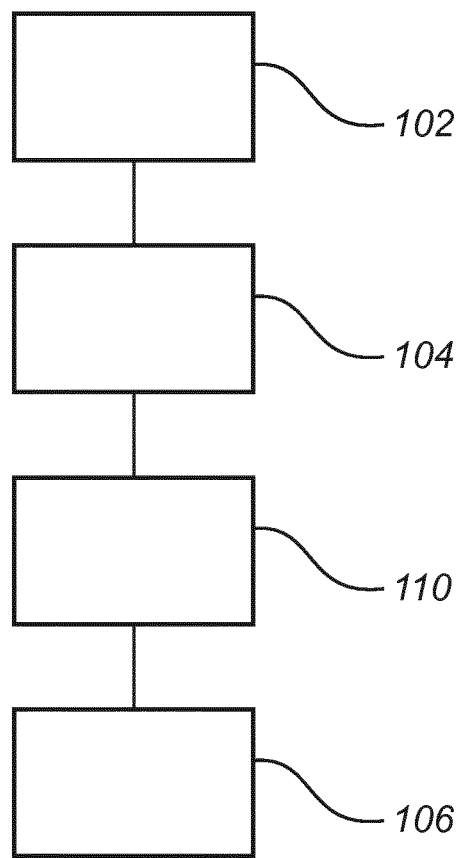
FIG. 4 is a flow chart outlining the general steps of a method according to an embodiment of the invention.

FIG. 4 outlines the steps of a method according to an embodiment of the invention where the requested power profile is a time continuous power profile, and where the method further comprises discretizing 110 the requested power profile and providing a response in the form of a time discrete power profile. The remaining method steps are the same as in the method described with reference to FIG. 1. The discretization is performed by the battery control unit, and the time continuous power profile is discretized into finite periods of constant power. The length of a period may for example be determined based on the shape of the requested power profile, or on the total duration of the power profile. The length of each period in the discretized power profile may also depend on the event giving rise to the request, i.e. on the properties of the requested power profile. The length may for example be 1s, 2s, 5s or the like for relatively short events such as braking or acceleration. The length may also be longer, such as 20-30 min, for longer events such as charging by an external source. Moreover, a discretized profile may comprise discrete periods differing in length.

Figure 5:
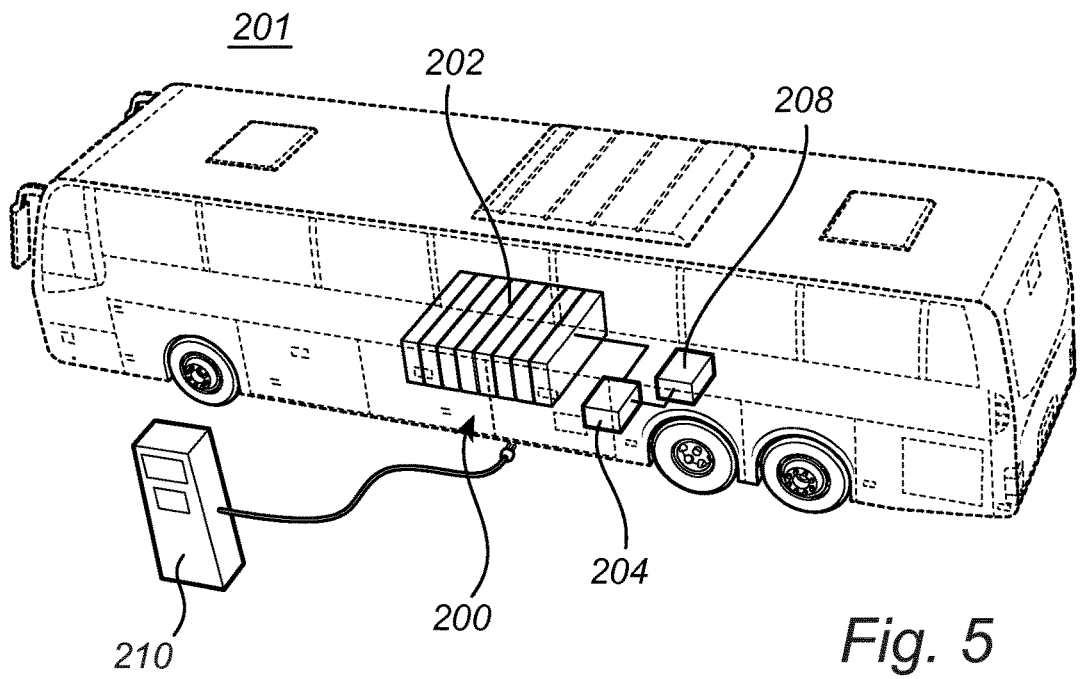
FIG. 5 schematically illustrates a battery control system according to an embodiment of the invention.

FIG. 5 schematically illustrates a battery control system 200 further comprising a vehicle control unit 208 which can send requests to the battery control unit 204. The vehicle control unit 208 may be a dedicated control unit configured to control a hybrid or electrical propulsion system, or it may be a general purpose vehicle control unit. The battery control unit 204 may include a microprocessor, microcontroller, programmable digital signal processor or another programmable device. Thus, the battery control unit 204 comprises electronic circuits and connections (not shown) as well as processing circuitry (not shown) such that the battery control unit 204 can communicate with different parts of the vehicle 201 such as the brakes, suspension, driveline, in particular an electrical engine, an electric machine, a clutch, and a gearbox in order to at least partly operate the vehicle 201. The battery control unit 204 may comprise modules in either hardware or software, or partially in hardware or software and communicate using known transmission buses such as CAN-bus and/or wireless communication capabilities. The processing circuitry may be a general purpose processor or a specific processor. The battery control unit 204 comprises a non-transitory memory for storing computer program code and data upon. Thus, the skilled addressee realizes that the battery control unit 204 may be embodied by many different constructions.

A request comprising a power profile may define charging of the battery, discharging of the battery, or a combination thereof. Example scenarios where charging of the battery 202 is requested by the vehicle control unit 208 may be when the vehicle is braking or when the vehicle is travelling downhill, where electrical motors are used to brake the vehicle. A request to draw power from the battery typically comes from acceleration of the vehicle.

FIG. 5 further illustrates that the vehicle 201 may be connected to charging station 210. Accordingly, a requested power profile may originate from a charging station 210. In an example embodiment, a user inputs information into the charging station 210 regarding a desired charging time. The vehicle may for example be connected during a short period such as during a lunch brake, or the vehicle may be connected for over night charging. For "lunch charging" it can be determined that it is important to charge the battery as much as possible in the given time, and a higher charging current is therefore selected compared to "over night" charging where a lower current can be used. When using a lower charging current, the battery temperature is lower compared to for a higher current, and maintaining the battery at a lower temperature may contribute to increasing the lifetime of the battery. Accordingly, the battery control unit can respond with an optimal power profile for the specified charging time.

In another example, the charging station 210 may provide information about the capabilities of the charging station 210 to the battery control unit 204, such as the maximum power which the charging station 210 can provide. The battery control unit 204 may then respond with a suggested power profile based on the properties of the battery 202 and based on the received information describing the charging station 210.

In the following, various examples of examples of power profiles and example situations where a power profile is requested will be given. The power profile is illustrated as power as a function of time. It should be noted that the illustrated profiles may represent both requested and suggested power profiles. The profiles may accordingly be used to illustrate an optimal power profile for a given situation. In the diagrams, a positive power represents charging of the battery and a negative power represents discharging.

Figure 6A:
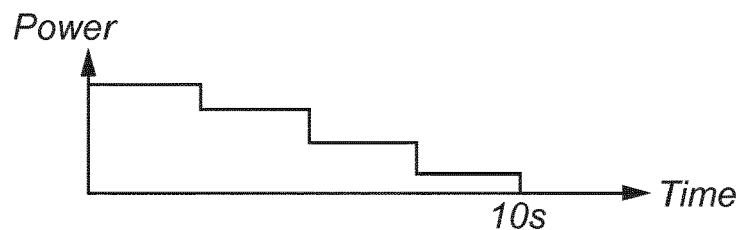
FIGS. 6A-C schematically illustrate exemplary power profiles to be used in embodiments of the invention.

FIG. 6A illustrates a power profile for charging the battery 202 during a short duration deceleration, such as when braking a vehicle 201. When the vehicle 201 begins to brake, a high power can be applied to the battery since the charging is most likely not limited by the temperature. Instead, the maximum power (i.e. current and voltage) which the battery can receive will be limiting. As the charging proceeds, the temperature of the battery 202 will increase and the power must be decreased as a consequence to avoid overheating the battery. In general the temperature increase is proportional to current squared times the resistance.

Figure 6B:
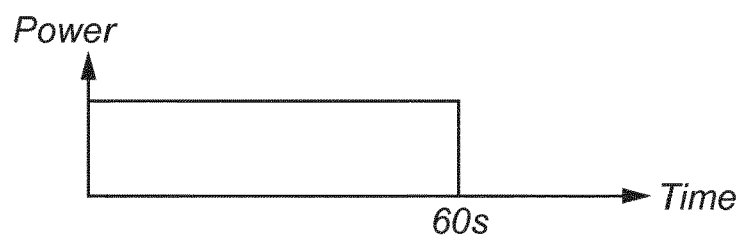

FIG. 6B illustrates a power profile illustrating charging of the battery 202 over a longer period of time compared to in FIG. 6A, such as when a vehicle 201 is travelling downhill and where an electrical motor is used to brake the vehicle. The maximum power that the battery 202 can receive for time periods on the order of a minute or a few minutes is lower than for shorter periods. Hence, it is important to apply a "long term" power profile for a long term charging event. In the illustrated example, a constant power is illustrated. However, it is equally possible that it is preferable to use a stepped profile also for a longer charging time.

Figure 6C:
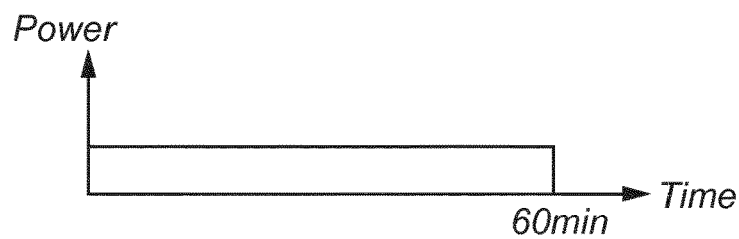

FIG. 6C illustrates an example where the vehicle 201 is connected to a charging station 210 for "lunch charging", i.e. for charging during a predetermined amount of time. Here, a constant power can be selected. However, a power profile describing a stepped power profile may also be used. An optimal power profile will in many cases be formed based on a tradeoff between the risk of not sufficiently charging the battery (too low power) and energy losses and battery degradation (too high power).

Figure 7:
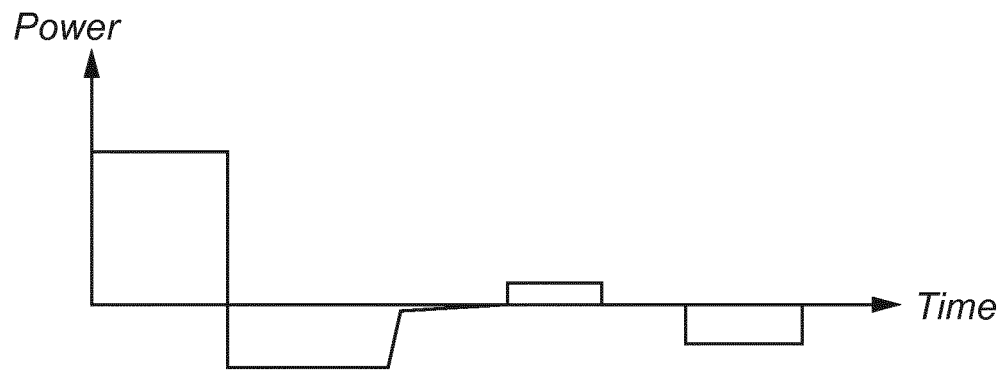
FIG. 7 schematically illustrates an exemplary power to be used in embodiments of the invention.

FIG. 7 illustrates a power profile for an upcoming route segment, comprising both charging and discharging periods. By adapting the power profile based on a predicted route, the battery utilization can be improved. For example, if it is known that certain power will be required later in the route, the battery can be managed such that the required power is available at the appropriate time. FIG. 7 may for example illustrate uphill and downhill segments of the road ahead, where portions illustrating a positive power represent downhill travel where the battery is charged through braking of the vehicle 201, and where the negative power portions represent flat or uphill road segments where power is required for vehicle propulsion. The battery control system 200 may thus be connected to a route planning or navigation system of the vehicle in order to optimize the usage of the battery 202. Moreover, the power profile may also comprise sections where the power is changing over time, illustrated by a slope in the power profile. A constant slope of the power profile may be represented by a start value, an end value and a duration.

Figure 8A:
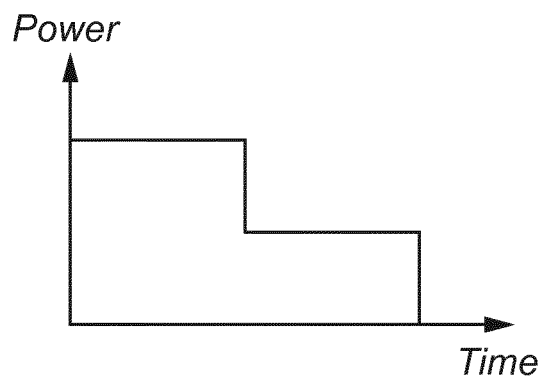
FIGS. 8A-C schematically illustrate exemplary power profiles to be used in embodiments of the invention.
Figure 8B:
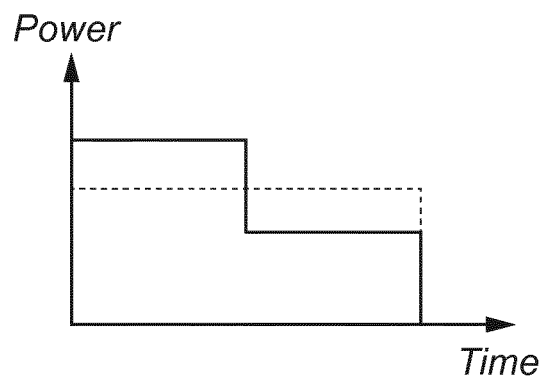
Figure 8C:
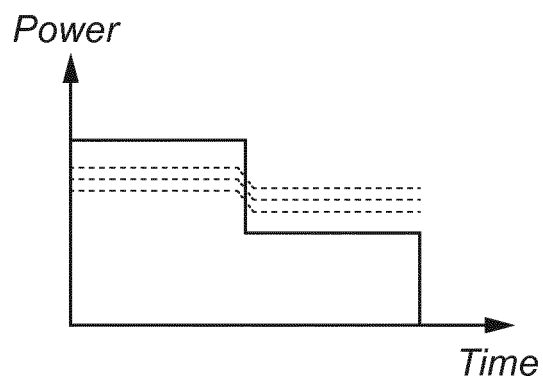

FIG. 8A illustrates a requested power profile illustrating a charging event comprising a first period at a higher power and a second period at a lower power. In the present example, it is assumed that the maximum power defined by the power profile exceeds the maximum power that the battery 202 can receive. Therefore, the battery control unit 204 responds with the suggested power profile illustrated by the dashed line in FIG. 8 B, which defines a constant power input to the battery 202 which is lower than the high period but higher than the low period of the requested power profile. Accordingly, the total energy provided to the battery can be made to be the same for the two power profiles but without exceeding the maximum allowable energy. FIG. 8C illustrates that the battery control unit 204 also may suggest a plurality of alternative power profiles as illustrated by the dashed lines.

Figures 9A, 9B:
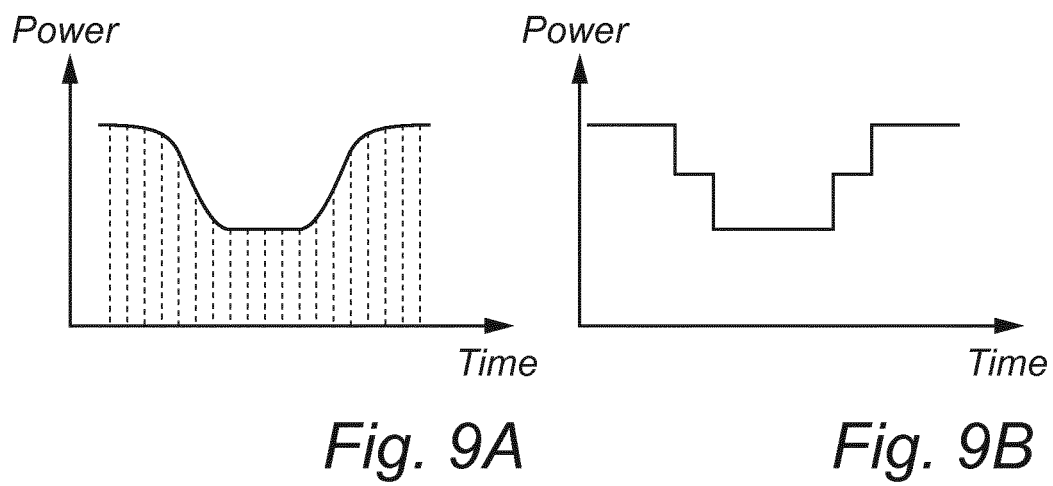
FIGS. 9A-B schematically illustrate exemplary power profiles to be used in embodiments of the invention.

FIGS. 9A-B illustrates the discretization of an example of a time continuous power profile according to the method described with reference to FIG. 4. The time continuous power profile of FIG. 9A is first sampled and then segmented into stepwise constant portions of appropriate length which are suitable for the battery 202.

It should be noted that the described examples are simplified and that a battery control unit in practice can handle very complex power profiles which may be either discrete or continuous.

Moreover, it is to be understood that the present invention is not limited to the embodiments described above and illustrated in the drawings; rather, the skilled person will recognize that many changes and modifications may be made within the scope of the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of communicating a power capacity of a battery of a vehicle in a battery control system comprising a battery and a battery control unit for controlling said battery, said battery control unit being configured to perform the method, comprising:
receiving a request comprising a power profile describing a power transfer to or from said battery as a function of time;
determining if said battery is capable of receiving or providing power corresponding to said requested power profile; and
providing a response indicative of a compliance with said requested power profile.

2. The method according to claim 1, wherein said response is indicative of a compliance with said requested power profile comprises a Boolean response.

3. The method according to claim 1, further comprising providing a response comprising a suggested power profile different from said requested power profile.

4. The method according to claim 1, wherein said response comprises a plurality of different suggested power profiles.

5. The method according to claim 1, wherein the response comprises a maximum constant power transfer for a specified period of time.

6. The method according to claim 1, wherein
said requested power profile is a time continuous power profile, and wherein the method further comprises
discretizing said requested power profile; and
providing a response in a form of a time discrete power profile.

7. The method according to claim 1, wherein the determining if said battery is capable of receiving or providing power corresponding to said requested power profile comprises simulating a battery behavior as a function of time based on a predicted voltage and temperature of said battery for said requested power profile.

8. The method according to claim 7, wherein said battery behavior is simulated based on a cell model of said battery.

9. The method according to claim 1, wherein said request is received from a vehicle control unit of said vehicle.

10. The method according to claim 9, wherein said request comprises a power profile to be provided by said battery to said vehicle during a predicted power consumption cycle of said vehicle.

11. The method according to claim 9, wherein said request comprises a power profile to be provided to said battery during a predicted power generation cycle of said vehicle.

12. The method according to claim 10, wherein said request comprises a power profile based on a predicted route of said vehicle.

13. The method according to claim 1, wherein said request is received from a charging station external to said vehicle.

14. The method according to claim 13, wherein said request comprises a power profile to be provided to said battery during a predicted charging cycle.

15. The method according to claim 13, wherein said request from said charging station comprises a predetermined charging time.

16. The method according to claim 13, wherein said request comprises information of charging properties of said charging station, and in that said response comprises a suggested power profile for charging said battery using said charging station based on said charging properties.

17. A computer program comprising program code means for performing the steps of claim 1 when said program is run on a computer.

18. A non-transitory computer readable medium carrying a computer program comprising program code means for performing the steps claim 1 when said program product is run on a computer.

19. A battery control system of a vehicle comprising: a battery and a battery control unit configured to:
receive a request comprising a power profile describing a power transfer to or from said battery as a function of time;
determine if said battery is capable of receiving or providing power corresponding to said requested power profile; and
provide a response indicative of a compliance with said requested power profile.

20. The battery control system according to claim 19, further comprising a vehicle control unit, wherein said vehicle control unit is configured to provide said request to said battery control unit.

21. The battery control system according to claim 19, further comprising a charging station external to said vehicle, and wherein said charging station is configured to provide said request to said battery control unit.

22. A vehicle comprising a battery control system according to claim 19.

\* \* \* \* \*